United States Patent [19]
Ohta et al.

[11] Patent Number: 6,130,763
[45] Date of Patent: Oct. 10, 2000

[54] METHOD OF AND SYSTEM FOR CORRECTING OUTPUT VALUES BASED UPON CONDITIONAL POLYNOMIALS

[75] Inventors: Yusuke Ohta, Kanagawa; Noboru Murayama, Tokyo, both of Japan

[73] Assignee: Ricoh Company, Ltd., Tokyo, Japan

[21] Appl. No.: 09/018,667

[22] Filed: Feb. 4, 1998

[30] Foreign Application Priority Data

Feb. 4, 1997 [JP] Japan ................................. 9-021281

[51] Int. Cl.[7] .............................. G03F 3/08; G06K 9/00
[52] U.S. Cl. ......................... 358/518; 358/519; 382/167
[58] Field of Search .................... 358/518, 519; 382/162, 167, 274, 275

[56] References Cited

U.S. PATENT DOCUMENTS 5,202,935  4/1993  Kanamori et al. .................... 382/54
5,659,406  8/1997  Imao et al. ........................... 358/518

*Primary Examiner*—Joseph Mancuso
*Assistant Examiner*—Derrick Fields
*Attorney, Agent, or Firm*—Knoble & Yoshida LLC

[57] ABSTRACT

A method and a system for correcting output color component values for a color image output used in devices such as a printer and a digital copier based upon independently selected input and output values and an interpolated curve line based upon a predetermined conditional polynomial equation.

12 Claims, 7 Drawing Sheets

M B CURVE

M B CURVE WITH c,d VARIED

METHOD OF AND SYSTEM FOR CORRECTING OUTPUT VALUES BASED UPON CONDITIONAL POLYNOMIALS

FIELD OF THE INVENTION

The current invention is generally related to a method of and a system for correcting output values based upon a conditional polynomial, and more particularly related to a method and a system for correcting output color component values for a color image output used in devices such as a printer and a digital copier based upon independently selected input and output values and an interpolated curve line based upon a predetermined conditional polynomial.

BACKGROUND OF THE INVENTION

In prior attempts for correcting non-liner relation between an input and an output values in image output machines, Bezier curves, polynomial curves and dividing curves are each used as a gamma ($\gamma$) correction curve. For example, a third Bezier curve as a $\gamma$-correction curve is expressed in the following equation:

$$B=(1-t)^3 P_0 + 3(1-t)^2 t P_1 + 3(1-t)t^2 P_2 + t^3 P_3 \qquad (1)$$

where B is an output result, Pi's are control points, t is a parameter ($0 \leq t \leq 1$). In order to alter the output results based upon a Bezier curve, the control points in the equation (1) are controlled. However, since the Bezier curve does not pass through the control points, the above described modifications are not generally intuitive and require trial and error approaches.

To facilitate the above described difficulty, the Bezier curve has been modified (herein after a modified Bezier curve or MB curve). A third MB curve is generally defined as follows:

$$MB=(1-t)^3 P_0 + (cP_1-(c-3)P_0)(1-t)^2 t + (dP2-(d-3)P_3)(1-t)t^2 + t^3 P_3 \qquad (2)$$

where curvature parameters c and d generally define curvature and c is an incline at the beginning while d is an incline at the end. When c=3 and d=3 in the above equation (2), the MB curve converge on a corresponding Bezier curve.

Now referring to FIG. 1, various MB curves are illustrated by modifying the curvature parameters c and d without modifying the control points. According to the above equation (2), after the curvature parameters c and d are determined, the output curve is primarily determined. Thus, two of the beginning inclination c, the ending inclination d, the coordinate (c−d)/8 at x=0.5 are determined. In order to determined other coordinates, a coefficient is changed to a polynomial. For example, c=c1+c2(1−t) where d=±c, three additional points other than the beginning and ending points are determined.

Theoretically speaking, by increasing the power of an polynomial, the number of passing points is also increased.

In applying a MB curve, assuming that $P_0=(0, 0)$, $P_1=(0, 1)$, $P_2=(1, 0)$ and $P_3=(1, 1)$, the output y is defined as follows:

$$y=c(1-t)^2 t + (3-d)(1-t)t^2 + t^3 \qquad (3)$$

t in the equation (3) is replaced by x in the following equation (4).

$$y=c(1-x)^2 x + (3-d)(1-x)x^2 + x^3 \qquad (4)$$

in other words, input x and output y are normalized and each range between 0 and 1. According to the equation (4), a curve becomes $dy/dx|x=0=c$ and $dy/dx|x=1=d$, $yx=0.5=0.5+$ (c−d)/8 where c is a slope at x=0 and d is a slope at x=1. (c−d)/8 expresses a distance from x=0.5. In other words, c and d respectively determine the slope at the beginning and the end while c−d determines a middle point.

Referring to FIG. 2, a number of the gamma-correction curves is illustrated by varying the curvature parameters c and d. The gamma correction curves have a common middle point, a common beginning point and a common ending point while other points are varied among the curves.

In the above described and other prior attempts, it is generally difficult to determine an outcome or results of the gamma correction in an intuitive manner. For approximated curves such as a collection of straight line segments require a large number of control points and tend to have errors in direction at joining points. On the other hand, rational polynomials generally require increased computation and complex expression. Lastly, Bezier curves require complex computation such as differential due to parameter while MB curves additionally require parameters c and d which are not intuitive in defining overall shape of the curves.

SUMMARY OF THE INVENTION

In order to solve the above and other problems, according to a first aspect of the current invention, a method of correcting output values, including the steps of: a) determining an input range and an output range; b) selecting n+1 pairs of $(x_i, y_i)$ values within said input range and said output range; and c) interpolating a line among said pairs of $(x_i, y_i)$ values based upon a conditional polynomial equation which satisfies the following relationship:

$$y = \sum_{i=0}^{n} y_i \frac{\Pi_{j \neq i}(x - x_j)}{\Pi_{j \neq i}(x_i - x_j)}$$

$$x_i \neq x_j \text{ if } i \neq j$$

According to a second aspect of the current invention, A system for correcting output values, including: a control unit for selecting n+1 pairs of $(x_i, y_i)$ values within an input range and an output range; and a $\gamma$-correction curve generation unit connected to the control unit for interpolating a line among said pairs of $(x_i, y_i)$ values based upon a conditional polynomial equation which satisfies the following relationship:

$$y = \sum_{i=0}^{n} y_i \frac{\Pi_{j \neq i}(x - x_j)}{\Pi_{j \neq i}(x_i - x_j)}$$

$$x_i \neq x_j \text{ if } i \neq j$$

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
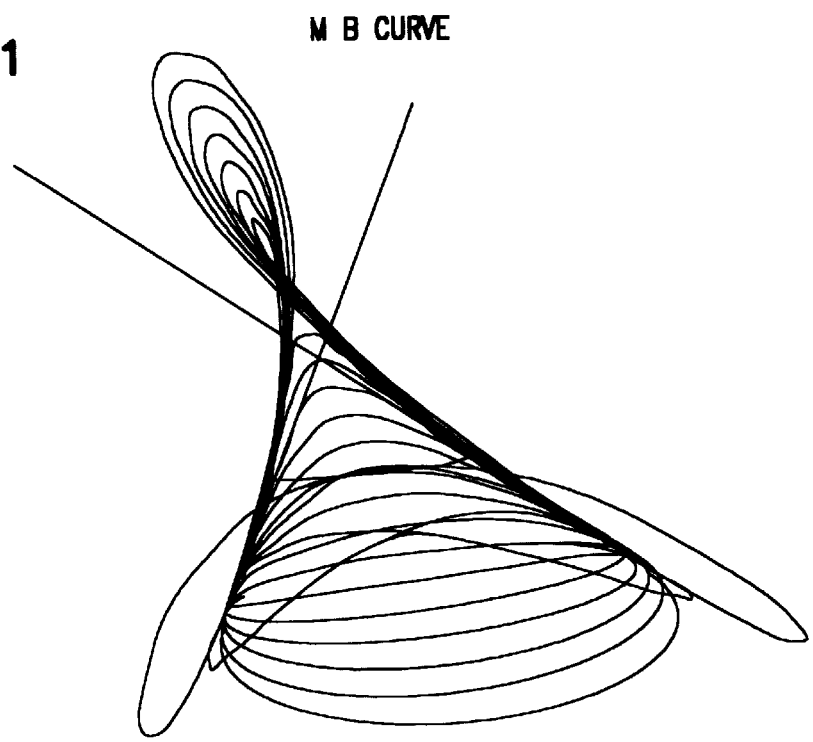
FIG. 1 illustrates a prior art Modified Bezier (MB) curve.
Figure 2:
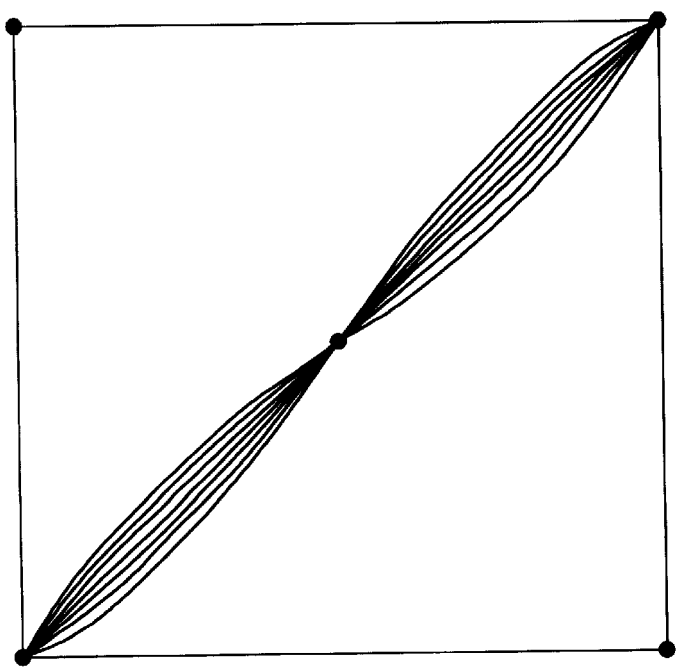
FIG. 2 illustrates a prior art MB curve with a set of modified values in parameters c and d.
Figure 3:
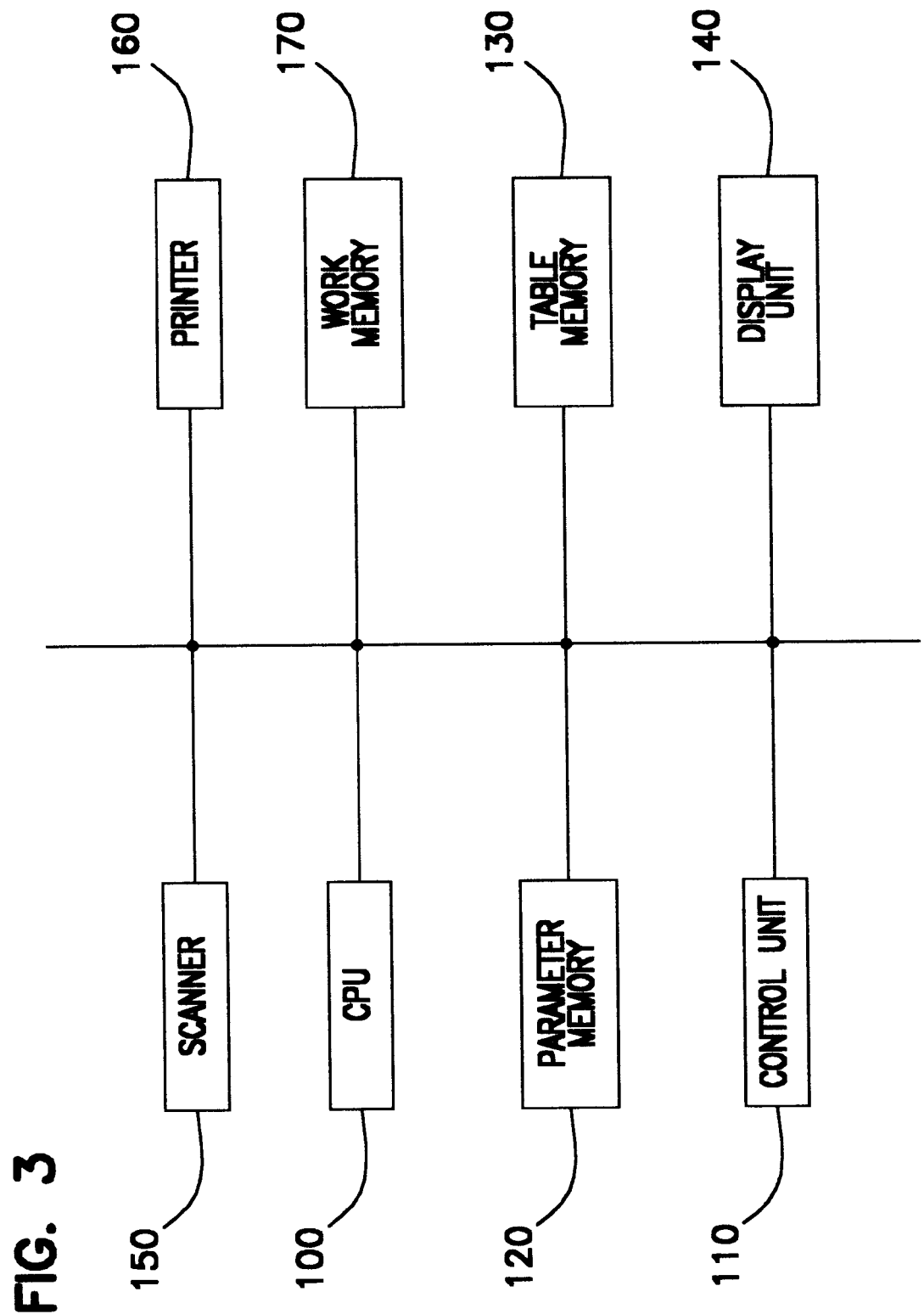
FIG. 3 is a block diagram illustrating a first preferred embodiment of the output correction system according to the current invention.

Referring now to the drawings, wherein like reference numerals designate corresponding structure throughout the views, and referring in particular to FIG. 3, one preferred embodiment of the output correction system according to the current invention includes a control unit 110, a parameter memory unit 120, a central processing unit (CPU) 100, a scanner 150, a printer 160, a work memory unit 170, a table memory unit 130 and a display unit 140. Parameters stored in the parameter memory unit 120 are used to generate a gamma correction curve in the work memory 170, and the CPU 100 determines output values for an output device such as the printer 160 in response to input values from an input device such as the scanner 150 according to a predetermined conditional polynomial function of the current invention. The display unit 140 displays not only the above described input and output values but also a gamma correction curve and other operationally guiding information. An alternative embodiment includes other input devices such as a video input device, a facsimile machine, and communication interfaces as well as other output devices such as communication interfaces.

Still referring to FIG. 3, the control unit 110 generally determines the mode of operation. If a plurality of parameter sets is stored in the parameter memory unit 120, the control unit 110 allows an operator to select a desirable set for a particular mode such as standard, light, dark or character mode. The control unit 110 also allows the operator to select a particular set of data from the table memory unit 130 which stores multiple sets of input and output values or conversion values which are calculated based upon a predetermined gamma correction curve. Lastly, the control unit 110 enables the operator to input a new set of parameters and to modify an existing set of parameters.

Figure 4:
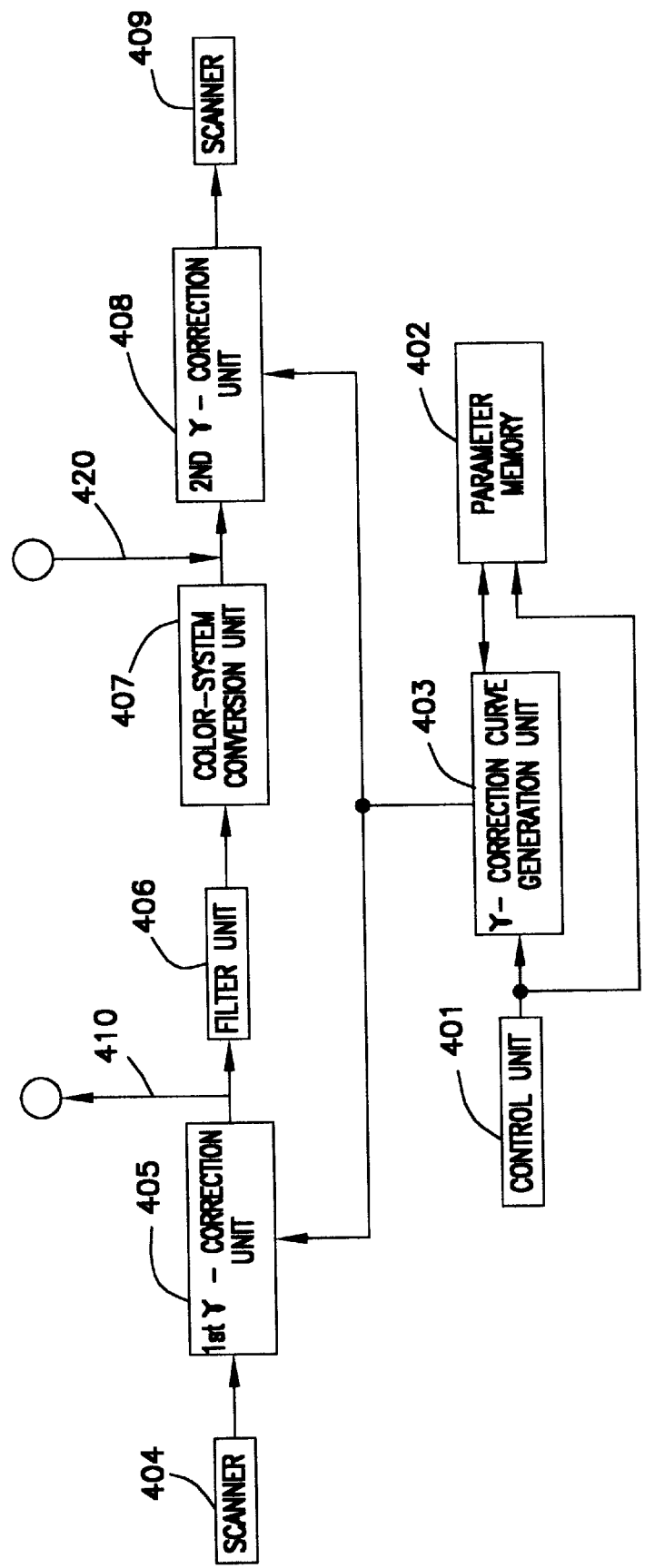
FIG. 4 is a block diagram illustrating a second preferred embodiment of the output correction system according to the current invention.

Referring to FIG. 4, another preferred embodiment of the output correction system according to the current system includes a control unit 401, a parameter memory 402, a gamma ($\gamma$) correction curve generation unit 403, a scanner 404, a first $\gamma$-correction unit 405, a filter unit 406, a color-system conversion unit 407, a second $\gamma$-correction unit 408 and a printer 409. The control unit 401 either automatically selects or allows an operator to select a parameter set stored in the parameter memory 402. Based upon the selected parameter set, the $\gamma$-correction curve generation unit 403 generates at least two $\gamma$-correction curves which include a first set of three $\gamma_1$-correction curves for red, green and blue (RGB) color components as well as a second set of four $\gamma_2$-correction curves for cyan, magenta, yellow and black (CMYK) color components.

Still referring to FIG. 4, the above described two gamma correction curves are applied to correct input data to generate output data as follows. The scanner 404 inputs image data in a RGB format, and the first $\gamma$-correction unit 405 corrects the RGB data based upon the three $\gamma_1$-correction curves. The filter unit 406 further processes the corrected RGB data for MTF correction and or averaging. The color-system conversion unit 407 converts the filtered RGB data into CMYK data. Lastly, the second $\gamma$-correction unit 408 corrects the CMYK data based upon the four $\gamma_2$-correction curves so as to best match the output characteristics of the printer 409. In the above described preferred embodiment, the corrected RGB data can be stored for a later use via a line 410. Such stored data may be used as desired input data regardless of the scanner characteristics. Certain CMYK data may inputted to the second $\gamma$-correction unit 408 via a line 420. Such inputted data may be more compatible to the characteristic of the printer 409. In an alternative embodiment of the system according to the current invention, in lieu of the first and second gamma correction units 405 and 406, the correction data is calculated and stored in advance. In another alternative embodiment, software to determine a gamma correction curve based upon a conditional polynomial may be stored in a temporary or secondary memory medium such as a floppy disk, and such software is installed or updated in the system.

Figure 5:
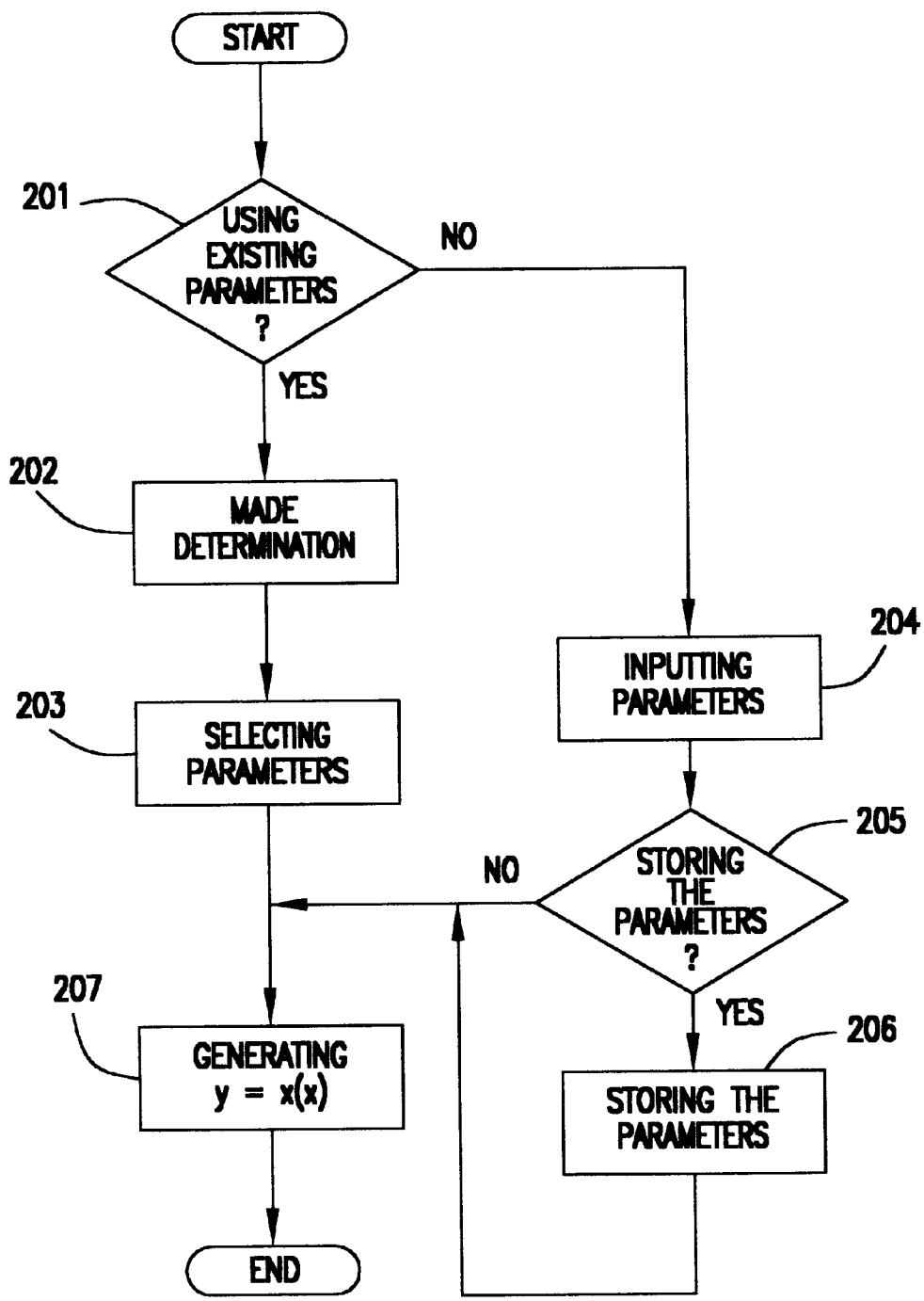
FIG. 5 is a flow chart illustrating steps involved in a preferred process according to the current invention.

Now referring to FIG. 5, steps involved in a preferred process of correcting output values according to the current invention are illustrated in a flow chart. In a step 201, it is determined whether or not an existing set of parameters is used. If an existing parameter set is to be used, a particular set or an associated mode is selected in a step 202. To select a particular parameter set, all of the existing sets may be displayed. In the alternative, the corresponding gamma correction curves may be displayed for selection. Based upon the mode, a corresponding set of parameters is read from storage in a step 203. The preferred process then proceeds to a step 207 where a gamma correction curve generation function or equation is generated based upon the parameters and a predetermined conditional polynomial. On the other hand, if a new set of parameter is to be used, new parameters are inputted. In a step 205, it is determined whether or not a newly inputted parameter set is to be stored or is to replace an existing parameter set. If the new parameters are to be stored, the new parameters along with a mode are written into a storage medium in a step 206, and the preferred process proceeds to the step 207. On the other hand, if the new parameters are not stored, the preferred process also proceeds to the step 207. For example, the above parameter set includes a predetermined number of pairs of coordinates or input/output values which determine a desirable gamma correction curve.

In an alternative process according to the current invention, a corresponding gamma correction curve equation is stored along with a parameter set. When an existing parameter set is selected, the corresponding gamma correction curve equation is used to generate the correction curve, and the generated curve is also displayed for visualization. The display is further used to specify a portion of the correction curve for modifying the selected portion in a manner as interactive and intuitive as manipulating a graphic equalizer in audio equipment. The above described portion includes a highlight portion, a middle portion and a shadow portion.

Figure 6:
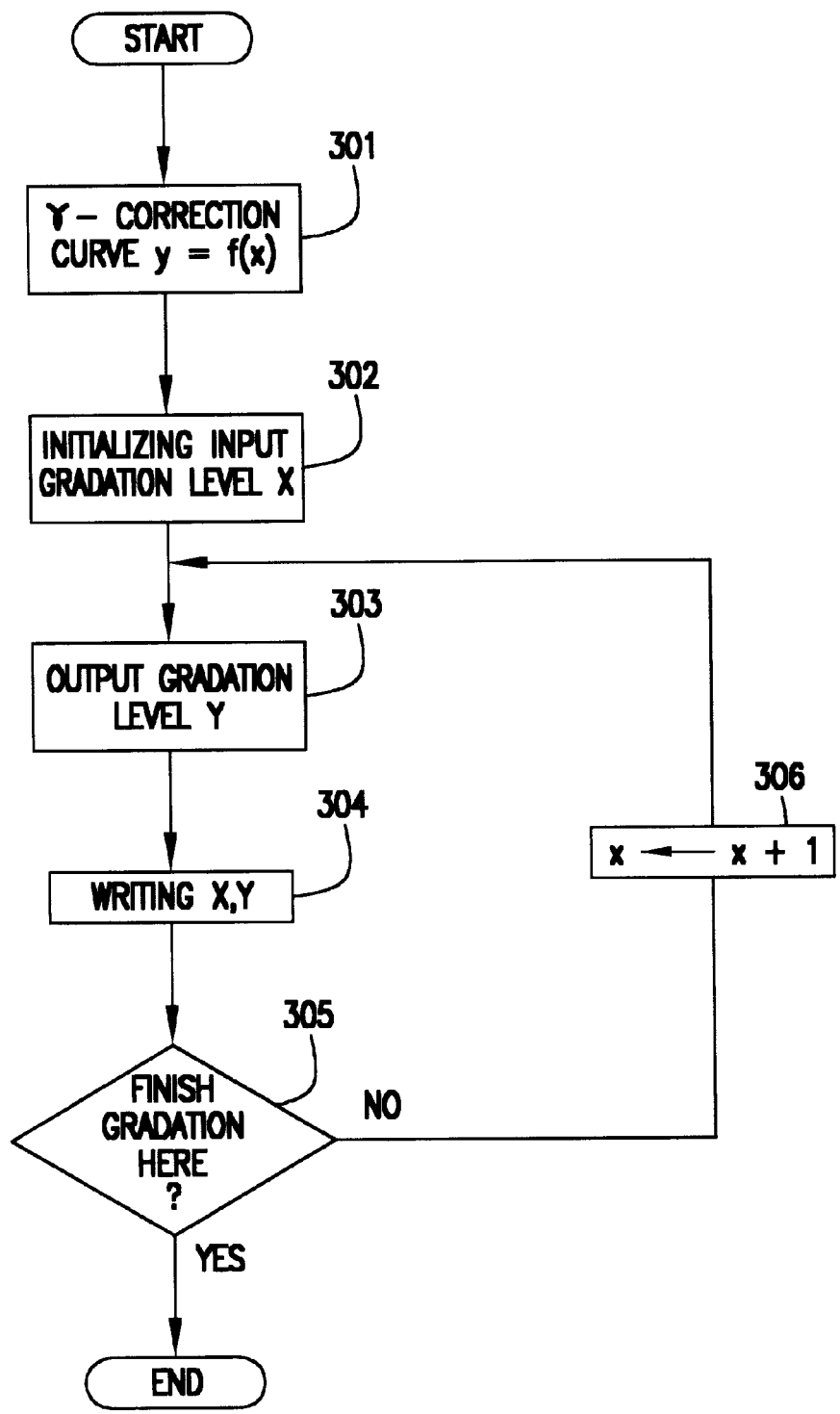
FIG. 6 is a flow chart illustrating steps involved in an alternative process according to the current invention.

Referring to FIG. 6, in another alternative process according to the current invention, steps are illustrated to generate a table storing pairs of input and output values which are generated based upon a selected conditional polynomial equation and a selected parameter set. In a step 301, a gamma correction curve equation is selected or generated. In a step 302, an initial input or gradation value is determined. Based upon the input value x, an output value y is generated based upon the gamma correction curve equation. The input value x and the output value y are stored in a table in a step 304. In a step 305, it is determine whether all of the input values are used to generate corresponding output values. If there remains an input value or another gradation value, a reference to the input value is incremented to refer to a next remaining input value. When all of the input values are processed, the alternative process ends.

In order to correct output values, a conditional polynomial equation is used so as to control the outcome in a predictable and intuitive manner. If n+1 conditions are specified, a n-th power equation is determined. A conditional polynomial is determined when a predetermined number of coordinates and associated angles at those coordinates on a desired curve is specified. These coordinates on the desired curve line include a beginning point, an ending point as well as a certain predetermined number of points located between the beginning and ending points. Only these coordinates are arbitrarily selected or specified within a predetermined range so as to specify a desired curve in an intuitive manner. Based upon a n pairs of specified coordinates, the following equation determines the desired curve:

$$y = \sum_{i=0}^{n} yi \frac{\Pi_{j \neq i}(x - x_j)}{\Pi_{j \neq i}(x_i - x_j)} x_i \neq x_j \text{ if } i \neq j \qquad (5)$$

A curve generated by the equation (5) passes through n+1 coordinates ($x_i$, $y_i$) whose x coordinates must be different. However, the y coordinates may be any value within the predetermined range. In general, the larger a number of specified coordinates is, the power of the polynomial increases. Consequently, finer controls of a desired curve are available.

To provide a specific example of the above described equation (5), n is chosen to be four. Although finer control is available at a high power, the conditional polynomial equation generally becomes complex and its computation intensifies as the power increases. For these reasons, the following example is illustrated based upon n=4.

$$\begin{aligned} y = & y_0(x-x_1)(x-x_2)(x-x_3)\frac{(x-x_4)}{(x_0-x_1)(x_0-x_2)(x_0-x_3)(x_0-x_4)} + \\ & y_1(x-x_0)(x-x_2)(x-x_3)\frac{(x-x_4)}{(x_1-x_0)(x_1-x_2)(x_1-x_3)(x_1-x_4)} + \\ & y_2(x-x_0)(x-x_1)(x-x_3)\frac{(x-x_4)}{(x_2-x_0)(x_2-x_1)(x_2-x_3)(x_2-x_4)} + \\ & y_3(x-x_0)(x-x_1)(x-x_2)\frac{(x-x_4)}{(x_3-x_0)(x_3-x_1)(x_3-x_2)(x_3-x_4)} + \\ & y_4(x-x_0)(x-x_1)(x-x_2)\frac{(x-x_3)}{(x_4-x_0)(x_4-x_1)(x_4-x_2)(x_4-x_3)} \end{aligned} \quad 6$$

A curve line specified by the above equation (6) passes through the five coordinates ($x_i$, $y_i$) where i=0, 1, 2, 3 and 4. In addition, the five coordinates are used to manipulate a highlight portion, a middle portion, a shadow portion after beginning and ending points are specified.

Figure 7A:
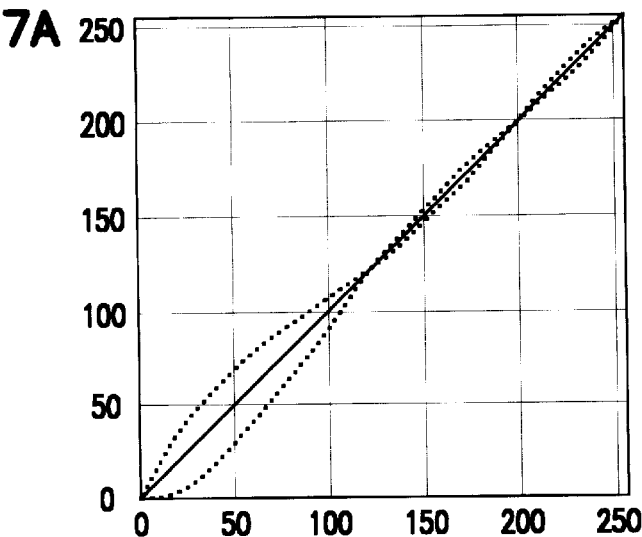
FIGS. 7A, 7B and 7C illustrate substantially independent manipulation of a certain output region of an image.
Figure 7B:
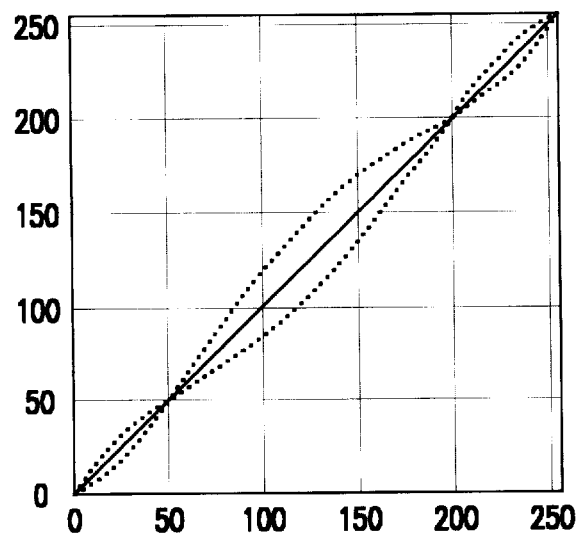
Figure 7C:
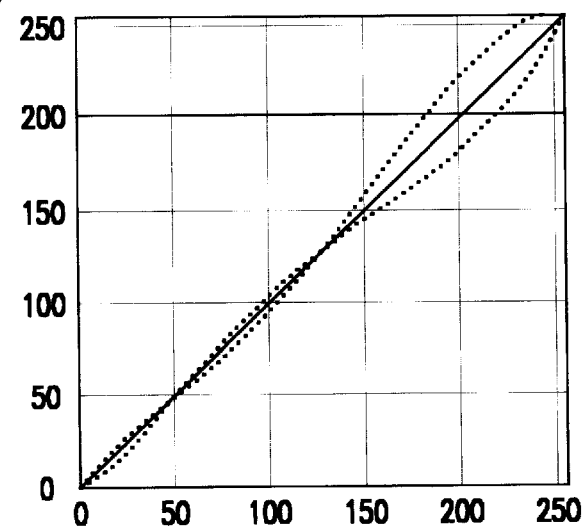

Now referring to FIGS. 7A, 7B and 7C, assuming eight bit or 256 gradations in output values, a certain portion of the gamma correction curve is modified, and the correction curve is generated based upon the above equation (6). FIG. 7A illustrates certain modified output values in a high light portion. A beginning point is (0, 0) while an ending point is (255, 255). Among the remaining three coordinates, the middle and shadow points are respectively fixed at (127, 127) and (200, 200). The highlight region has three modified coordinates which include (50, 70), (50, 50) and (50, 30). Similarly, referring to FIG. 7B, the highlight and shadow points are respectively fixed at (50, 50) and (200, 200). By the same token, the beginning point is (0, 0) while the ending point is (255, 255). The middle region has three modified coordinates which include (127, 147), (127, 127) and (127, 107). Lastly, referring to FIG. 7C, the beginning, highlight, middle and ending points are respectively fixed at (0, 0), (50, 50), (127, 127) and (255, 255). The shadow region has three modified coordinates which include (200, 220), (200, 200) and (200, 180). Although it is natural to specify the x coordinate at ¼ and ¾ position of the range along the x axis (i.e., x=63 and 191), when the middle region is manipulated, other regions are also affected by the manipulation in the middle region. For this reason, the x coordinate positions in the highlight and shadow regions are respectively moved to x=55 and 220 so as to avoid the above described effects. Although the y coordinate value may be outside the range between 0 and 255 depending upon conditions specified for the polynomial, the y values are adjusted to stay in the range. As described above, the manipulation of the gamma correction curve is substantially intuitive and independent in each region in an output color image, and the conditional polynomial equation accommodates the specified x and y coordinates which are used as conditions.

Figure 8A:
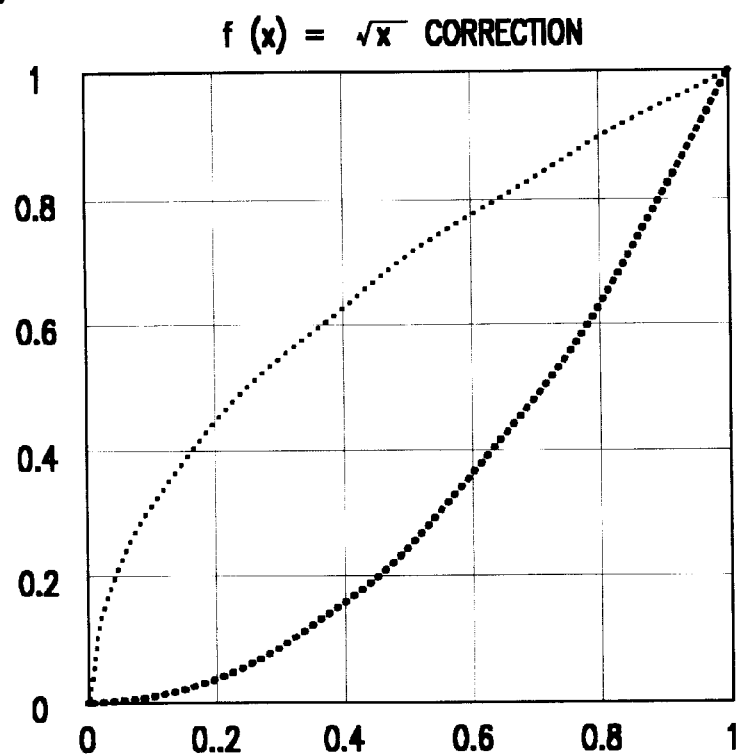
FIGS. 8A and 8B illustrate an example of correction based upon an inverse function.
Figure 8B:
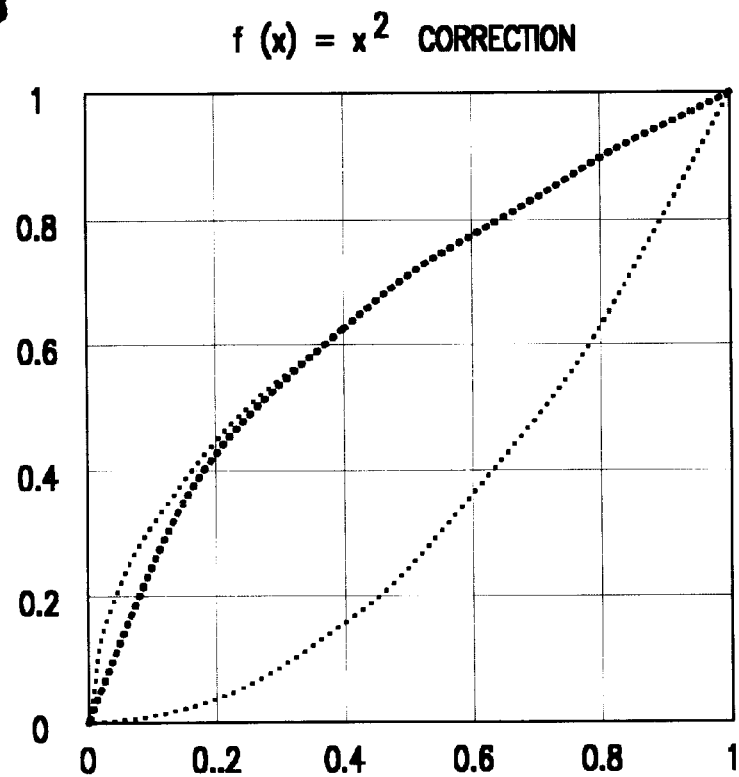

Referring to FIGS. 8A and 8B, in general, it is possible to convert a curve expressed by a conditional polynomial equation into a straight line. For the sake of simplicity, both graphs have been normalized between 0 and 1. An inverse function $f^{-1}(x)$ converts a given function f(x) into a straight line function y=x. This is accomplished by replacing x coordinate values by corresponding y coordinate values. FIGS. 8A and 8B illustrate one example of the above described conversion between $f(x)=\sqrt{x}$ and its inverse function $f(x)=x^2$. A function to be corrected is shown in fine dotted lines while an inverse function is shown in solid lines. The function which is derived from a conditional polynomial is shown in bold dotted lines. Referring particularly to FIG. 8A, since an inverse function of $f(x)=\sqrt{x}$ is $y=x^2$, a conditional polynomial function matches the inverse function. On the other hand, referring to FIG. 8B, since it is impossible to precisely express an inverse function $y=\sqrt{x}$ based upon a polynomial, there is discrepancy between the inverse function and the polynomial correction curve. However, based upon certain coordinates, there may be a substantial match as shown in FIG. 8B. There is no need for these functions to be continuous, and discontinuous data such as experimental data is also corrected in the above described manner. One useful application of the above described straight line conversion is color balance correction.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of correcting output values, based on a γ-correction curve in an image processing system, comprising the steps of:

a) determining an input range and an output range;
b) selecting n+1 pairs of $(x_i, y_i)$ values within said input range and said output range; and
c) interpolating a line among said pairs of $(x_i, y_i)$ values based upon a conditional polynomial equation which satisfies the following relationship:

$$y = \sum_{i=0}^{n} yi \frac{\Pi_{j \neq i}(x - x_j)}{\Pi_{j \neq i}(x_i - x_j)}$$

$x_i \neq x_j$ if $i \neq j$ where $n \geq 2$, so as to correct the output values.

2. The method of correcting output values according to claim 1 wherein said pairs of $(x_i, y_i)$ values are independently specified.

3. The method of correcting output values according to claim 2 wherein a predetermined number of values on said interpolated line is stored.

4. The method of correcting output values according to claim 1 wherein a set of said input range and said output range represents a color component conversion.

5. The method of correcting output values according to claim 4 wherein n is four and said conditional polynomial is a fourth conditional polynomial as follows:

$$y = y_0(x-x_1)(x-x_2)(x-x_3)\frac{(x-x_4)}{(x_0-x_1)(x_0-x_2)(x_0-x_3)(x_0-x_4)} +$$

$$y_1(x-x_0)(x-x_2)(x-x_3)\frac{(x-x_4)}{(x_1-x_0)(x_1-x_2)(x_1-x_3)(x_1-x_4)} +$$

$$y_2(x-x_0)(x-x_1)(x-x_3)\frac{(x-x_4)}{(x_2-x_0)(x_2-x_1)(x_2-x_3)(x_2-x_4)} +$$

$$y_3(x-x_0)(x-x_1)(x-x_2)\frac{(x-x_4)}{(x_3-x_0)(x_3-x_1)(x_3-x_2)(x_3-x_4)} +$$

$$y_4\frac{(x-x_0)(x-x_1)(x-x_2)(x-x_3)}{(x_4-x_0)(x_4-x_1)(x_4-x_2)(x_4-x_3)}.$$

6. The method of correcting output values according to claim 5 wherein said pairs of $(x_i, y_i)$ values include $(x_0, y_0)$ through $(x_4, y_4)$ which respectively specify an initial point, an ending point, a first point in a highlight area, a second point in a middle area and a third point in a shadow area.

7. A system for correcting output values, comprising:
a control unit for selecting n+1 pairs of $(x_i, y_i)$ values within an input range and an output range; and
a γ-correction curve generation unit connected to said control unit for interpolating a line among said pairs of $(x_i, y_i)$ values based upon a conditional polynomial equation which satisfies the following relationship:

$$y = \sum_{i=0}^{n} yi \frac{\Pi_{j \neq i}(x - x_j)}{\Pi_{j \neq i}(x_i - x_j)}$$

$x_i \neq x_j$ if $i \neq j$ where $n \geq 2$.

8. The system for correcting output values according to claim 7 further comprising a memory unit connected to said control unit and said γ-correction curve generation unit for storing said pairs of $(x_i, y_i)$ values.

9. The system for correcting output values according to claim 8 wherein said memory unit stores a predetermined number of values on said interpolated line is stored.

10. The system for correcting output values according to claim 7 wherein a set of said input range and said output range represents a color component conversion.

11. The system for correcting output values according to claim 10 wherein n is four and said conditional polynomial is a fourth conditional polynomial as follows:

$$y = y_0(x-x_1)(x-x_2)(x-x_3)\frac{(x-x_4)}{(x_0-x_1)(x_0-x_2)(x_0-x_3)(x_0-x_4)} +$$

$$y_1(x-x_0)(x-x_2)(x-x_3)\frac{(x-x_4)}{(x_1-x_0)(x_1-x_2)(x_1-x_3)(x_1-x_4)} +$$

$$y_2(x-x_0)(x-x_1)(x-x_3)\frac{(x-x_4)}{(x_2-x_0)(x_2-x_1)(x_2-x_3)(x_2-x_4)} +$$

$$y_3(x-x_0)(x-x_1)(x-x_2)\frac{(x-x_4)}{(x_3-x_0)(x_3-x_1)(x_3-x_2)(x_3-x_4)} +$$

$$y_4(x-x_0)(x-x_1)(x-x_2)\frac{(x-x_3)}{(x_4-x_0)(x_4-x_1)(x_4-x_2)(x_4-x_3)}.$$

12. The system for correcting output values according to claim 11 wherein said pairs of $(x_i, y_i)$ values include $(x_0, y_0)$ through $(x_4, y_4)$ which respectively specify an initial point, an ending point, a first point in a highlight area, a second point in a middle area and a third point in a shadow area.

* * * * *